US012211507B2

(12) United States Patent
Ohlendorf et al.

(10) Patent No.: US 12,211,507 B2
(45) Date of Patent: Jan. 28, 2025

(54) SELECTIVELY IMPLEMENTING ROLE CHANGE REQUESTS FOR AUXILIARY DEVICES THAT FACILITATE ASSISTANT INTERACTIONS

(71) Applicant: Google LLC, Mountain View, CA (US)

(72) Inventors: Max Ohlendorf, Emerald Hills, CA (US); Moses Derkalousdian, San Diego, CA (US); Michael Kartoz, Surprise, AZ (US); Aleksey Shaporev, Cambridge, MA (US); Caleb Fujimori, Atherton, CA (US)

(73) Assignee: GOOGLE LLC, Mountain View, CA (US)

( * ) Notice: Subject to any disclaimer, the term of this patent is extended or adjusted under 35 U.S.C. 154(b) by 543 days.

(21) Appl. No.: 17/534,145

(22) Filed: Nov. 23, 2021

(65) Prior Publication Data

US 2023/0108367 A1   Apr. 6, 2023

Related U.S. Application Data

(60) Provisional application No. 63/251,187, filed on Oct. 1, 2021.

(51) Int. Cl.
*G10L 15/30* (2013.01)
*G10L 15/22* (2006.01)

(52) U.S. Cl.
CPC .............. *G10L 15/30* (2013.01); *G10L 15/22* (2013.01); *G10L 2015/223* (2013.01)

(58) Field of Classification Search
CPC .... G10L 15/30; G10L 15/22; G10L 2015/223

(Continued)

(56) References Cited

U.S. PATENT DOCUMENTS

2009/0322513 A1 * 12/2009 Hwang ............... H04W 4/90
                                                    600/301
2019/0297553 A1 *  9/2019 Wang ............... H04W 36/0094

(Continued)

FOREIGN PATENT DOCUMENTS

CN      108513196 A    9/2018
EP        3836557 A1   6/2021

OTHER PUBLICATIONS

Feng et al., "Continuous Authentication for Voice Assistants", MobiCom'17, Oct. 16020, 2017 (Year: 2017).*

(Continued)

*Primary Examiner* — Tsu-Chang Lee
(74) *Attorney, Agent, or Firm* — Gray Ice Higdon

(57) ABSTRACT

Implementations relate to role change requests that can be delayed and/or implemented according to circumstances associated with an interaction between a user and an automated assistant. A role change request can cause a designation of auxiliary devices (e.g., earbuds and/or any other peripheral devices) to be changed, and at least cause a different auxiliary device to be tasked with directly communicating with a principal device (e.g., a cellular phone). For instance, when an auxiliary device is requesting a role change request during an assistant interaction, an operating system of the principal device can identify factors that form the basis for determining whether to immediately implement the role change request or, instead, to delay or refuse implementation of the role change request. When the factors indicate that the role change request is not particularly urgent, the operating system can cause the role change request to be delayed until the assistant interaction is complete.

20 Claims, 6 Drawing Sheets

(58) Field of Classification Search
USPC .................................................. 704/270.1
See application file for complete search history.

(56) References Cited

U.S. PATENT DOCUMENTS

| | | | | |
|---|---|---|---|---|
| 2020/0184057 | A1* | 6/2020 | Mukund | G06F 21/44 |
| 2020/0322788 | A1* | 10/2020 | Batra | H04W 8/24 |
| 2021/0405148 | A1* | 12/2021 | Han | G01S 1/805 |
| 2022/0164271 | A1* | 5/2022 | Murray | G06F 3/0632 |
| 2022/0342726 | A1* | 10/2022 | Brown | G06F 9/542 |

OTHER PUBLICATIONS

European Patent Office; International Search Report and Written Opinion issued in Application No. PCT/US2022/042722; 12 pages; dated Dec. 23, 2022.
European Patent Office; Communication pursuant to Article 94(3) issued in Application No. 22787035.9, 6 pages; dated Oct. 4, 2024.

* cited by examiner

SELECTIVELY IMPLEMENTING ROLE CHANGE REQUESTS FOR AUXILIARY DEVICES THAT FACILITATE ASSISTANT INTERACTIONS

BACKGROUND

Humans can engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") can provide commands and/or requests to an automated assistant using spoken natural language input (i.e., utterances), which may in some cases be converted into text and then processed, and/or by providing textual (e.g., typed) natural language input.

In some instances, a user can communicate with their automated assistant, directly or indirectly, via different devices. The different devices can have varying degrees of reliability with respect to signal strength, charge capacity, and/or other variable features of the device. As a result, interruptions to interactions between the user and their automated assistant can occur as resources for a certain feature briefly wane. For example, an interaction with an automated assistant via a wearable peripheral device (e.g., an earbud) can be interrupted when an antenna of the wearable peripheral device experiences a loss in signal strength. In order to complete the interaction with the automated assistant, the user may need to invoke the automated assistant through a different device (e.g., their cellphone). Re-invoking the automated assistant in such circumstances can be duplicative depending on how far along the user was in the previously interrupted interaction. Furthermore, although certain resource limitations can be predictable (e.g., decline in battery life), many assistant-enabled devices rely on the user to select a device that is most suitable for a forthcoming assistant request. As a result, resources such as memory and power can be wasted at devices, such as wearable devices, that may have relatively limited resources.

SUMMARY

Implementations set forth relate to performing changes to dynamically adapt communication hierarchies of auxiliary devices, which facilitate interactions with an automated assistant that is available at a principal device. The auxiliary devices(s) can be, for example, two or more devices (e.g., earbuds) that are in communication with a principal device (e.g., a cellular phone) that provides access to the automated assistant. When these various devices are in communication, one auxiliary device can be designated as a primary auxiliary device and another auxiliary device can be designated as a secondary auxiliary device. These designations can indicate that the primary auxiliary device receives data directly from the principal device and the secondary auxiliary device may not receive data directly from the principal device. Rather, the secondary auxiliary device may receive indirect communications from the principal device via the primary auxiliary device. Alternatively, or additionally, these designations can indicate that the primary auxiliary device can send data directly to the principal device and the secondary auxiliary device may not send data directly to the principal device.

As one example, a pair of earbuds that play music hosted at the principal device (e.g., a cellular phone) can have a primary earbud that receives audio data from the principal device and a secondary earbud that receives audio data from the primary earbud. More particularly, first audio data and second audio data can be received at the primary earbud from the principal device through a first communications channel that is exclusively between the primary earbud and the principal device. The primary earbud can render the first audio data via component(s) of the primary earbud. Further, the primary earbud can transmit the second audio data to the secondary earbud via a second communications channel that is exclusively between the primary earbud and the secondary earbud.

The auxiliary devices can host a device engine for managing and controlling various features of the auxiliary devices and/or for interacting with the principal device. For example, the device engine can make decisions about how to optimize performance of the auxiliary device by balancing battery life for each respective auxiliary device. Balancing battery life can be necessary when a primary auxiliary device is consuming battery charge at a higher rate than a secondary auxiliary device (e.g., as a result of operating as the primary auxiliary device). In some instances, the device engine can initialize a change in designation of a primary auxiliary device to be a secondary auxiliary device, and a secondary auxiliary device to be the primary auxiliary device. This change in roles for each auxiliary device can be initialized by the device engine, which can take precautionary measures before initializing the role change. For example, the device engine can submit a role change request to an operating system and/or an automated assistant at a principal device to put the operating system and/or the automated assistant on notice that the device engine is seeking to perform the role change. In some implementations, the automated assistant can respond to the request for the role change with a delay request to delay the role change in certain circumstances. Alternatively, or additionally, the operating system can respond to the request by scheduling the role change according to information available to the principal device.

For example, during an interaction with an automated assistant, such as when a user initially invokes the automated assistant (e.g., "Hey, Assistant . . . "), the device engine of a pair of auxiliary devices (e.g., wireless earbuds) can submit a role change request. In response to the role change request, the operating system can determine factor(s) that are influencing why the device engine is requesting the role change. In some implementations, these factor(s) can be characterized by role change data that is submitted by the device engine with the request. The role change data can indicate, for example, that the role change is being submitted to balance battery consumption of the auxiliary devices. Based on this determination, the operating system and/or the automated assistant can approve or deny the request for the role change. For instance, while the user is providing a spoken utterance to the automated assistant, the device engine can provide the role change request to the operating system. In response, the automated assistant can request to defer the role change until the automated assistant interaction with the user is considered complete or terminated. Alternatively, when the role change request is being "forced," submitted because of: a malfunction with the auxiliary devices (e.g., an error that interrupts communication between a primary auxiliary device and the principal device), the primary auxiliary device has run out of battery, and/or the primary auxiliary device has been removed by the user, the operating system can approve the role change regardless of any response from the automated assistant. As a result, the role change can occur while the user is providing their spoken utterance to the automated assistant according to one or more different role change techniques.

In some instances, the device engine of the auxiliary devices can submit a role change request to the automated assistant and/or an operating system of the principal device while the automated assistant is actively awaiting input from the user. For example, the user can invoke the automated assistant, causing the automated assistant to actively await spoken input from the user. For instance, the automated assistant can be invoked in response to detecting a tap at one of the auxiliary devices (e.g., based on sensor data from accelerometer(s) and/or other sensor(s) of the auxiliary device), detection (e.g., at one of the auxiliary devices, or at the primary device and utilizing audio data detected via microphone(s) of one of the auxiliary devices) of an invocation phrase of the automated assistant, or detecting tapping of a selectable element rendered at a graphical user interface (GUI) of the principal device (e.g., a cellular phone). In response to the automated assistant being invoked, microphones, or other audio input interfaces, of one or both of the auxiliary devices (e.g., earbuds) can be initialized for capturing a spoken utterance. However, the user may, simultaneous to invoking the automated assistant, have their right hand over their right ear, thereby interrupting communications of a designated primary auxiliary device (e.g., the right earbud) that has been mounted in the right ear of the user. The device engine can act to resolve this interruption of communications by submitting a role change request to the operating system and/or automated assistant to cause the left earbud to be designated as the primary auxiliary device and the right earbud to be designated as the secondary auxiliary device. In this way, the left earbud would be tasked with capturing any forthcoming spoken utterances from the user and communicating audio data (i.e., user utterance data) of those spoken utterance(s) to the principal device.

The automated assistant can request, based on the current circumstances (e.g., as reflected in role change data submitted with the request), to postpone the role change until the automated assistant receives a spoken utterance from the user and/or a countdown timer has expired. For instance, when the role change request is identified as a non-fatal request (e.g., not the result of an error that necessitates rebooting of the primary auxiliary device), a delay request for postponing the role change can be approved. The operating system and/or device engine can then schedule the role change for after completion of a current assistant interaction and/or after expiration of the countdown timer. In some instances, when the role change request is identified as affecting an ongoing interaction (e.g., the user is covering the primary auxiliary device with their hand) the automated assistant can cause the role change request to be granted without delay. As a result, the role change request can occur, thereby allowing the secondary auxiliary device to be designated as the primary auxiliary device for communicating audio data (e.g., audio data corresponding to the spoken utterance from the user) directly to the principal device. In some implementations, this role change can be accomplished without the automated assistant being notified of the role change.

In some implementations, the device engine of the auxiliary devices can submit a role change request to the automated assistant and/or operating system of the principal device when the automated assistant is simultaneously providing an output (e.g., an audible response to a spoken utterance). For example, when the user has invoked the automated assistant with a spoken utterance such as, "Assistant, what's on my agenda?" the automated assistant can respond with an audible response via the auxiliary devices (e.g., earbuds). However, when the automated assistant and/or operating system of the principal device receives the role request during rendering of the audible response, the automated assistant can determine whether to allow the role request to be implemented. For instance, the automated assistant can permit the role request to be implemented based on one or more sources of data available to the automated assistant.

When the operating system and/or automated assistant permits the role request to be implemented, or the role request is otherwise permitted to continue during the rendering of the audible response from the automated assistant, state data corresponding to the primary auxiliary device can be maintained at the principal device. The state data can then be communicated to the new primary auxiliary device (i.e., the former secondary auxiliary device) so that the new primary auxiliary device can communicate effectively with the principal device after the role change. For example, the state data can provide details regarding an interaction between a user and the automated assistant. In some implementations, audio data corresponding to the audible response can be buffered at each of the auxiliary devices so that the auxiliary devices can continue to render the audible response while the role change occurs. For example, when the automated assistant is rendering the audible response (e.g., an agenda for the day) to a query, an operating system and/or application associated with the auxiliary devices (e.g., earbuds) can initialize a role change. As a result, state data, such as sub-band codec (SBC) parameters and assistant invocation settings (e.g., whether "hot word" detection is enabled, or a token containing information about the user's current assistant conversation state), can be communicated from the principal device to the current secondary auxiliary device (i.e., the soon-to-be primary auxiliary device). Audio data and/or other auxiliary device data can then be communicated, after the role change is implemented, to the new primary auxiliary device while the audible response is still being rendered to the user via the auxiliary devices.

The above description is provided as an overview of some implementations of the present disclosure. Further description of those implementations, and other implementations, are described in more detail below.

Other implementations can include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations can include a, a computing device (e.g., a primary device or an auxiliary device), or a system of computing device(s) that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
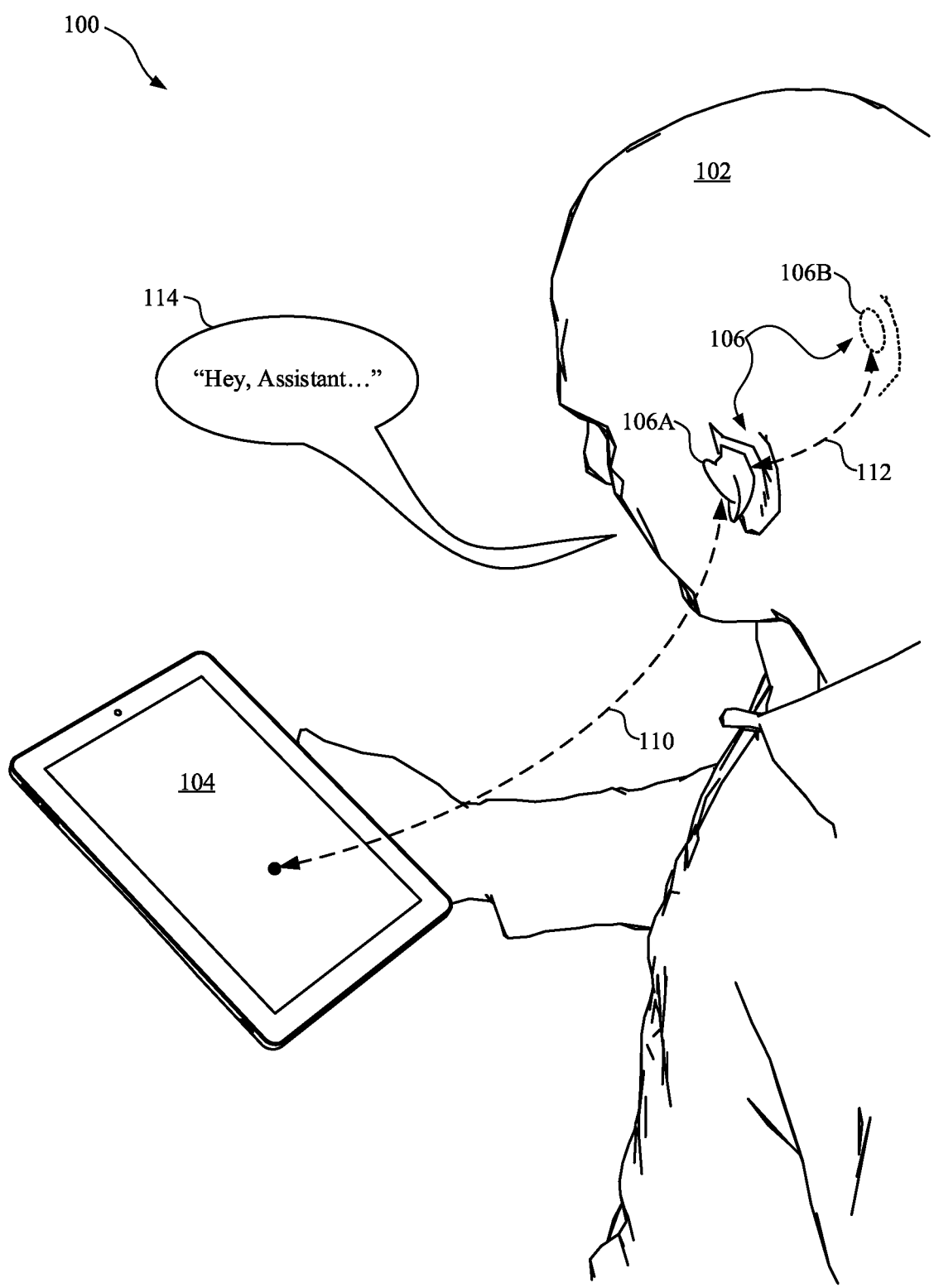
FIG. 1A, FIG. 1B, and FIG. 1C illustrate views of a computing device that is in communication with auxiliary devices that can undergo scheduled role change requests according to circumstances associated with the role change requests.
Figure 1B:
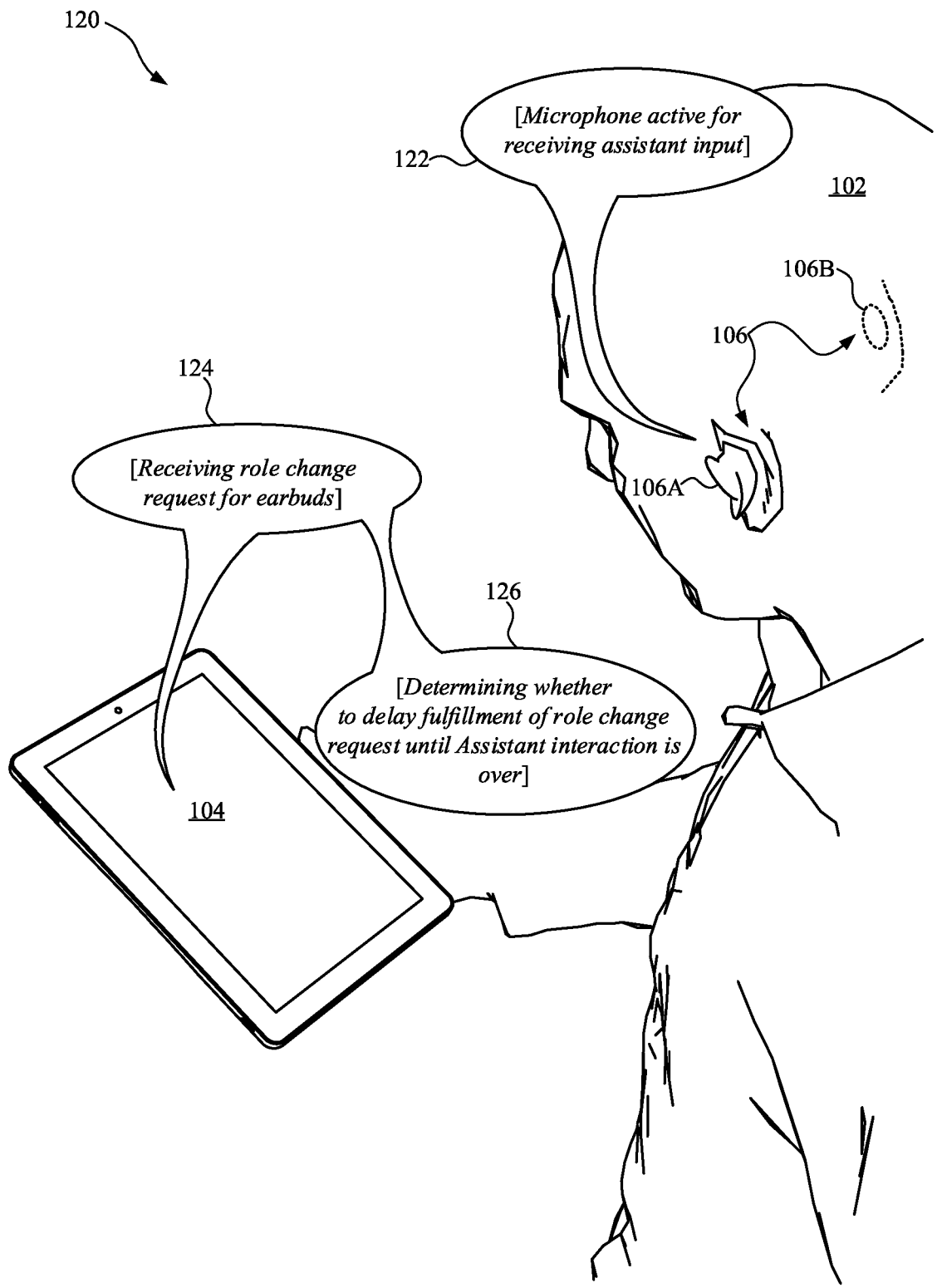
Figure 1C:
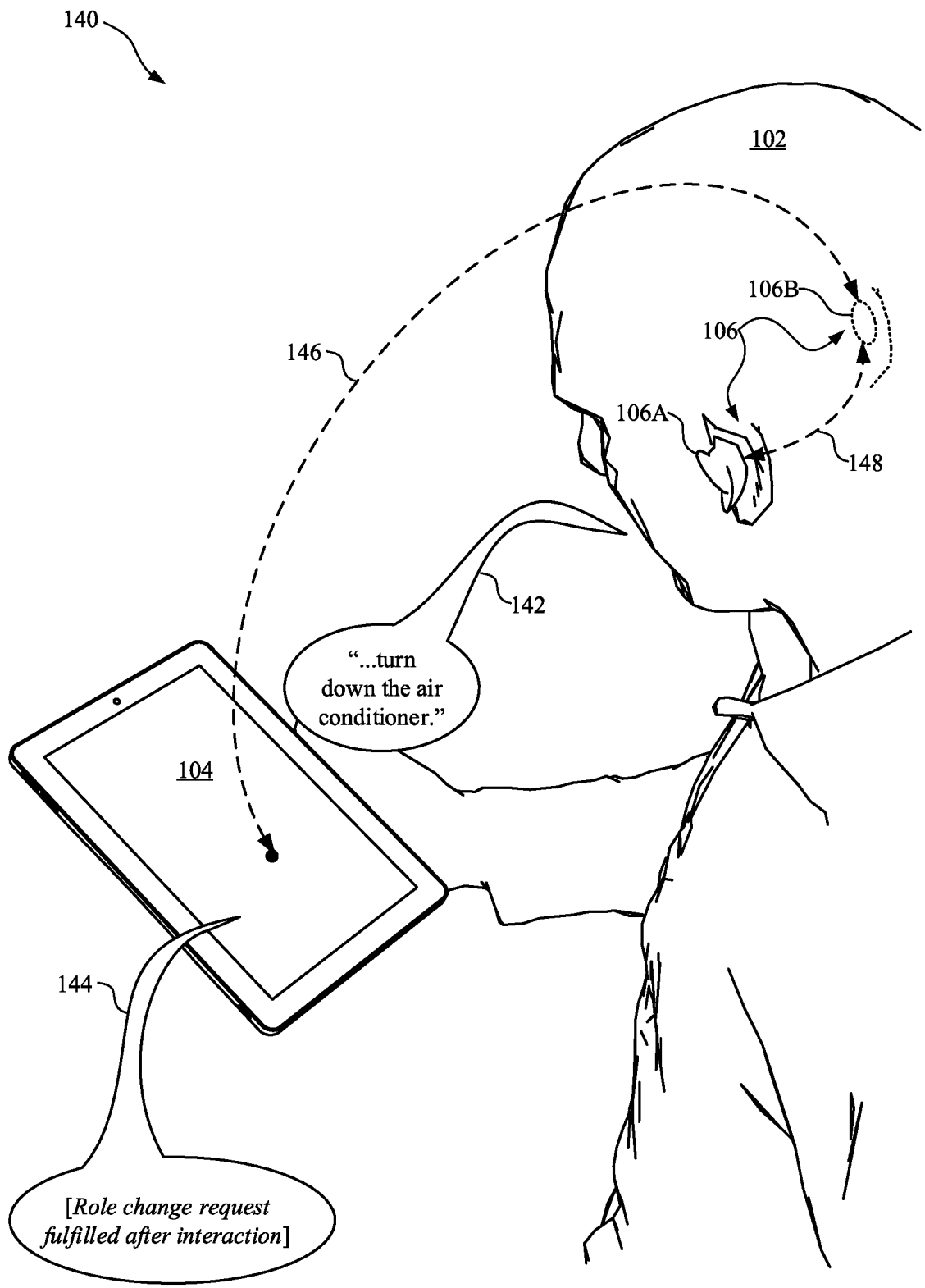

FIG. 1A, FIG. 1B, and FIG. 1C illustrate a view 100, a view 120, and a view 140 of a computing device 104 that is in communication with auxiliary devices 106 that can undergo scheduled role change requests according to circumstances associated with the role change requests. For instance, the computing device 104 can provide access to an automated assistant, and role change requests for the auxiliary devices can be scheduled according to whether certain operations are being performed, or are expected to be performed, by the automated assistant. For example, the user 102 can provide a spoken utterance 114 such as "Hey, Assistant . . . " to invoke the automated assistant at the computing device 104. The spoken utterance can be detected by one or more of the auxiliary devices 106, which can include auxiliary device 106A and auxiliary device 106B. The auxiliary device 106A can be designated as a primary auxiliary device and the auxiliary device 106B can be designated as a secondary auxiliary device. As a result of being designated as the primary auxiliary device, the auxiliary device 106A can communicate via a direct communication channel 110 with the computing device 104. As a result of being designated as the secondary auxiliary device, the auxiliary device 106B can communicate via another direct communication channel 112 with the auxiliary device 106A, but may not directly communicate directly with the computing device 104. For instance, a direct communication can refer to data that is communicated via the direct communication channel 110 (e.g., a Bluetooth connection) that is established between two devices.

A role change request can be initialized at the computing device 104 and/or the auxiliary devices 106 for designating a different auxiliary device as the primary auxiliary device. For example, a device engine corresponding to the auxiliary devices can generate a role change request and communicate the role change request to an operating system of the computing device 104. The role change request can be generated for a variety of different reasons such as, but not limited to, balancing battery charge consumption, resolving an error or malfunction, adapting to environmental changes (e.g., the user 102 placed their hand over their ear), and/or any other event that may necessitate a role change. In some instances, a role change request can be submitted by the device engine when a status 122 of the currently-designated primary auxiliary device may not be suitable for a role change.

For example, the auxiliary device 106A can have a status 122 that indicates a microphone of the auxiliary device 106A is active, after the user provided the spoken utterance 114. The microphone can be active in anticipation of the user 102 providing a follow-up spoken utterance that directs the automated assistant to perform a particular operation. When the computing device 104 and/or operating system receives the role change request for the auxiliary devices 106 (e.g., earbuds), as indicated by status 124, the operating system can determine whether to delay the role change or implement the role change, as indicated by status 126. For instance, the role change request can be considered a first type of request that can be delayed or a second type of request that should not be delayed. When the operating system determines that the role change request is a second type of request, the operating system can permit the role change request to be implemented. However, when the role change request is the first type of request and the automated assistant is determined to be participating in an interaction with the user 102, the operating system and/or the automated assistant can cause implementation of the role change request to be delayed.

For example, the automated assistant can be notified of the role change request and, in response, request that implementation of the role change request be delayed. When the operating system determines to delay the role change request, the user 102 may continue to interact with the automated assistant without realizing there is a pending role change request. For instance, the user 102 can provide another spoken utterance 142 such as, " . . . turn down the air conditioner," which can be received at the primary auxiliary device (e.g., the auxiliary device 106A). When the auxiliary device 106A is still designated as the primary auxiliary device, a microphone of the auxiliary device 106A can generate audio data characterizing the spoken utterance 142 and provide the audio data to the computing device 104. When the automated assistant determines that the user 102 has not provided another input for a threshold period of time and/or returns to an invocation phrase detection mode, the automated assistant can provide an indication to the operating system and/or device engine.

In response, the role change request being implemented per status 144, the auxiliary device 106A can be designated as a secondary auxiliary device, and the other auxiliary device 106B can be designated as a primary auxiliary device. As a result, and as indicated in FIG. 1C, the other auxiliary device 106B can communicate with the computing device 104 via a direct communication channel 146. Additionally, as a result of the role change request being implemented, the auxiliary device 106A can communicate with the other auxiliary device 106B via a direct communication channel 148, and may not communicate directly with the computing device 104. In some implementations, when a role change request is implemented, data from the former primary auxiliary device can be communicated to the newly designated primary auxiliary device for allowing the newly designated primary auxiliary device to continue certain operations. For example, the data can include encoding parameters for encoding information that is communicated between the former primary auxiliary device and the computing device 104. The newly designated primary auxiliary device can use encoding parameters to "mimic" the former primary auxiliary device and communicate via an established communications channel with the computing device 104.

Alternatively, or additionally, a state of each particular auxiliary can be maintained at the computing device 104 and/or the device engine so that a state of a former primary auxiliary device can be shared with a newly designated primary auxiliary device. For example, state data (e.g., a configuration profile) corresponding to a former primary auxiliary device can be used to generate updated state data for a newly designated primary auxiliary device, thereby allowing the newly designated primary auxiliary device to transition without having to directly communicate with the former primary auxiliary device. This can be particularly useful in circumstances in which the role change request necessitates a reboot of one or more auxiliary devices, thereby temporarily limiting an ability of the one or more auxiliary devices to communicate.

Figure 2:
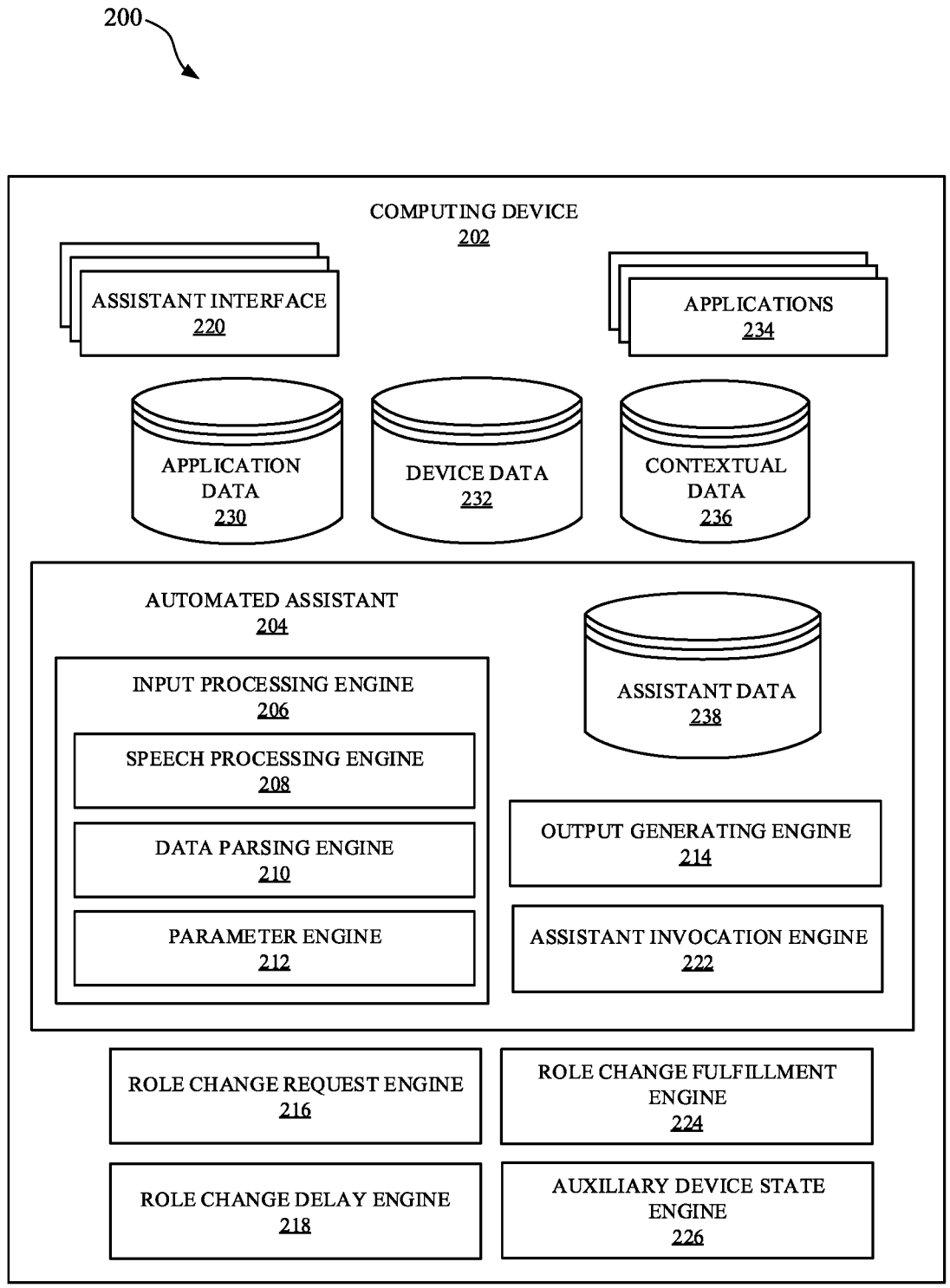
FIG. 2 illustrates a system that can dynamically adapt communication hierarchies of auxiliary devices, which facilitate interactions with an automated assistant that is available at a principal device.

FIG. 2 illustrates a system 200 that can dynamically adapt communication hierarchies of auxiliary devices, which facilitate interactions with an automated assistant that is available at a principal device. The automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.). Alternatively, the automated assistant 204 can be initialized based on processing of contextual data 236 using one or more trained machine learning models. The contextual data 236 can characterize one or more features of an environment in which the automated assistant 204 is accessible, and/or one or more features of a user that is predicted to be intending to interact with the automated assistant 204. The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device implementation. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device implementation can be performed using an on-device implementation module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device implementation can then initiate local and/or remote performance/execution of the determined action(s) to resolve the spoken utterance.

In various implementations, remote speech processing, remote NLU, and/or remote implementation can at least selectively be utilized. For example, recognized text can at least selectively be transmitted to remote automated assistant component(s) for remote NLU and/or remote implementation. For instance, the recognized text can optionally be transmitted for remote performance in parallel with on-device performance, or responsive to failure of on-device NLU and/or on-device implementation. However, on-device speech processing, on-device NLU, on-device implementation, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data in order to determine whether or not to wait for a user to explicitly speak an invocation phrase to invoke the automated assistant 204, or consider the data to be indicative of an intent by the user to invoke the automated assistant-in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 222 can cause the automated assistant 204 to detect, or limit detecting, spoken invocation phrases from a user based on features of a context and/or an environment.

In some implementations, the system 200 can include a role change request engine 216 that can generate a role change request for one or more auxiliary devices based on one or more different factors. A role change request can refer to a request for an auxiliary device to be designated as a primary auxiliary device for receiving direct communications from a principal device. In some instances, a role change request generated by the role change request engine 216 can correspond to a type of role change request such as, but not limited to, an urgent role change request and/or a non-urgent role change request. In some implementations, an urgent role change request may be necessary to avoid malfunction of a device and/or application, and a non-urgent role change request may be generated to improve performance of an auxiliary device and/or application.

In some implementations, the system 200 can include a role change delay engine that can determine that the role change request engine 216 is requesting a role change, and determine whether to delay the role change. The role change delay engine 218 can determine to delay implementation of the role change request when the one or more operations of an application and/or device may be affected by the role change. For example, when auxiliary devices are being used to interact with the automated assistant 204 when the role change request is generated, the role change delay engine 218 may cause the implementation of the role change request to be delayed. In some implementations, this delay can be instituted when the role change request is determined to not be an urgent type of role change request. As a result, the role change delay engine 218 can schedule the implementation of the role change request for when one or more conditions are satisfied (e.g., when an interaction between a user and the automated assistant 204 has completed or terminated).

In some implementations, the system 200 can include a role change implementation engine 224 that can initialize implementation of a role change request. For example, when the role change request is performed while the automated assistant 204 is awaiting an input from a user, the role change implementation engine 224 can cause a first auxiliary device to communicate data to a second auxiliary device. In some implementations, the first auxiliary device can communicate communication settings (e.g., Bluetooth protocol data) to the second auxiliary device to allow the second auxiliary device to "mimic" the first auxiliary device without a principal device being aware of the role change. In some implementations, an auxiliary device state engine 226 of the system 200 can generate state data characterizing a state of a first auxiliary device and another state of a second auxiliary device that may be in communication with the computing device 202. The state data can be used to generate data for communicating to an auxiliary device that may be re-designated from a secondary auxiliary device to a primary auxiliary device. For example, state data can indicate that a primary auxiliary device has invocation phrase detection deactivated. When a new primary auxiliary device is selected, this state data can be shared with the new primary auxiliary device so that the new primary auxiliary device will also have invocation phrase detection deactivated.

Figure 3:
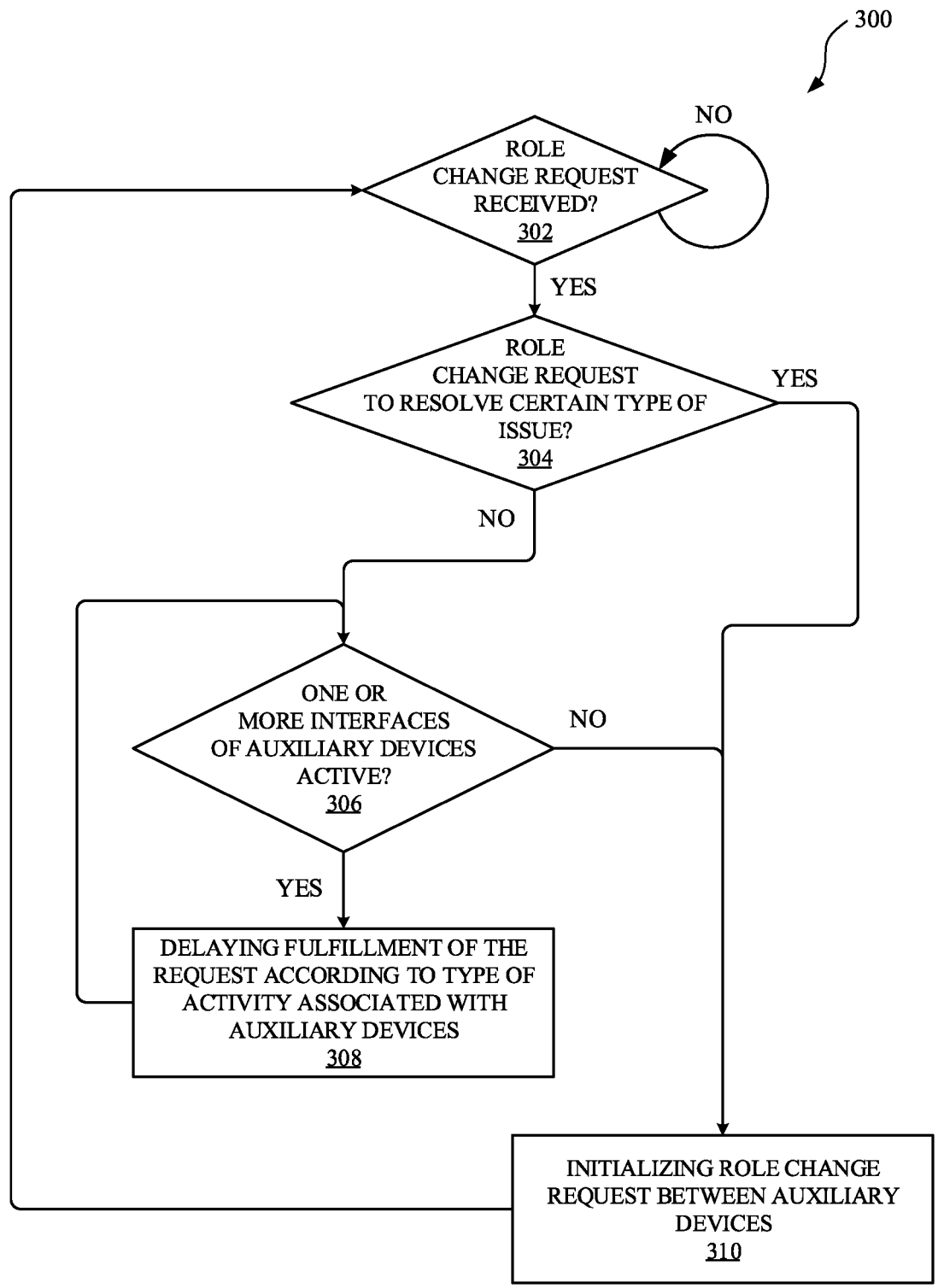
FIG. 3 illustrates a method for performing a role change between auxiliary devices that are in communication with a principal computing device and facilitate interactions with an automated assistant.

FIG. 3 illustrates a method 300 for performing a role change between auxiliary devices that are in communication with a principal computing device and facilitate interactions with an automated assistant. The method 300 can be performed by one or more computing devices, applications, and/or any other apparatus or module that can be associated with an automated assistant. The method 300 can include an operation 302 of determining whether a role change request has been received at the principal computing device. The principal computing device can include an operating system and device engine that can generate role change requests based on a variety of different information. The auxiliary devices can be in communication with the principal computing device to facilitate certain functionality that may not be available at the principal computing device. In some implementations, the auxiliary devices can be a pair of wireless earbuds that can gently reside in a right ear and a left ear, respectively, of a user for listening to audio generated at an application of the principal computing device. Alternatively, or additionally, the auxiliary devices can be a pair of audio devices that include different types of interfaces (e.g., tactile, microphone, speaker, etc.).

The device engine of the auxiliary devices and/or operating system of the principal computing device can designate a first auxiliary device as a primary auxiliary device and a second auxiliary device as a secondary auxiliary device. As a result of these designations, the primary auxiliary device can receive communications directly from the principal computing device and the secondary auxiliary device can operate according to the communications between the primary auxiliary device and the principal computing device. A role change request can refer to a request that, when implemented, causes an auxiliary device that is designated as a primary auxiliary device to be designated (i.e., reassigned) as a secondary auxiliary device. Furthermore, when the role change request is implemented, another auxiliary device that was previously designated as a secondary auxiliary device can be designated (i.e., reassigned) as a primary auxiliary device.

When a role change request is determined to have been received at an operation 302 of the method 300, the method 300 can proceed from the operation 302 to an operation 304. Otherwise, the operation 302 can continue to be executed until a role change request is determined to have been received. The operation 304 can include determining whether the role change request has been provided to resolve a certain type of issue(s). The certain type of issue can include, but is not limited to, errors that may necessitate rebooting one or more of the auxiliary devices and/or interrupting an ongoing process associated with one or more of the auxiliary devices. When the role change request is determined to be directed to resolving this certain type of issue, the method 300 can proceed to an operation 310 for initializing the role change request between the auxiliary devices.

When the role change request is determined to not be directed to resolving the certain type of issues, the method 300 can proceed from the operation 304 to an operation 306. The operation 306 can include determining whether one or more interfaces of one or more auxiliary devices are active. For example, the device engine and/or operating system of the principal device can determine whether a microphone of a currently-designated primary auxiliary device is active in anticipation of receiving a spoken utterance from a user. Alternatively, or additionally, the device engine and/or operating system of the principal device can determine whether the microphone of the currently-designated primary auxiliary device is actively receiving a spoken utterance from a user. Alternatively, or additionally, the device engine and/or operating system of the principal device can determine whether an audio speaker of the currently-designated primary auxiliary device is rendering an output for the user. In some instances, the principal device can provide access to an automated assistant, which can receive inputs and/or render outputs via the auxiliary devices.

When the one or more interfaces of the auxiliary devices are determined to not be active at the operation 306, the method 300 can proceed to the operation 310. Otherwise, when the one or more interfaces of the auxiliary devices are determined to be active at the operation 306, the method 300 can proceed to an operation 308. The operation 308 can include delaying implementation of the role change request according to the type of activity associated with the auxiliary devices. For example, when a microphone of a primary auxiliary device is determined to be active for receiving a spoken utterance from a user, the role change request can be delayed until the microphone is no longer active. Thereafter, the method 300 can proceed from the operation 308 to the operation 306 for determining whether the one or more interfaces of the auxiliary devices are no longer active, and proceed to the operation 310 when the one or more interfaces are no longer active.

Figure 4:
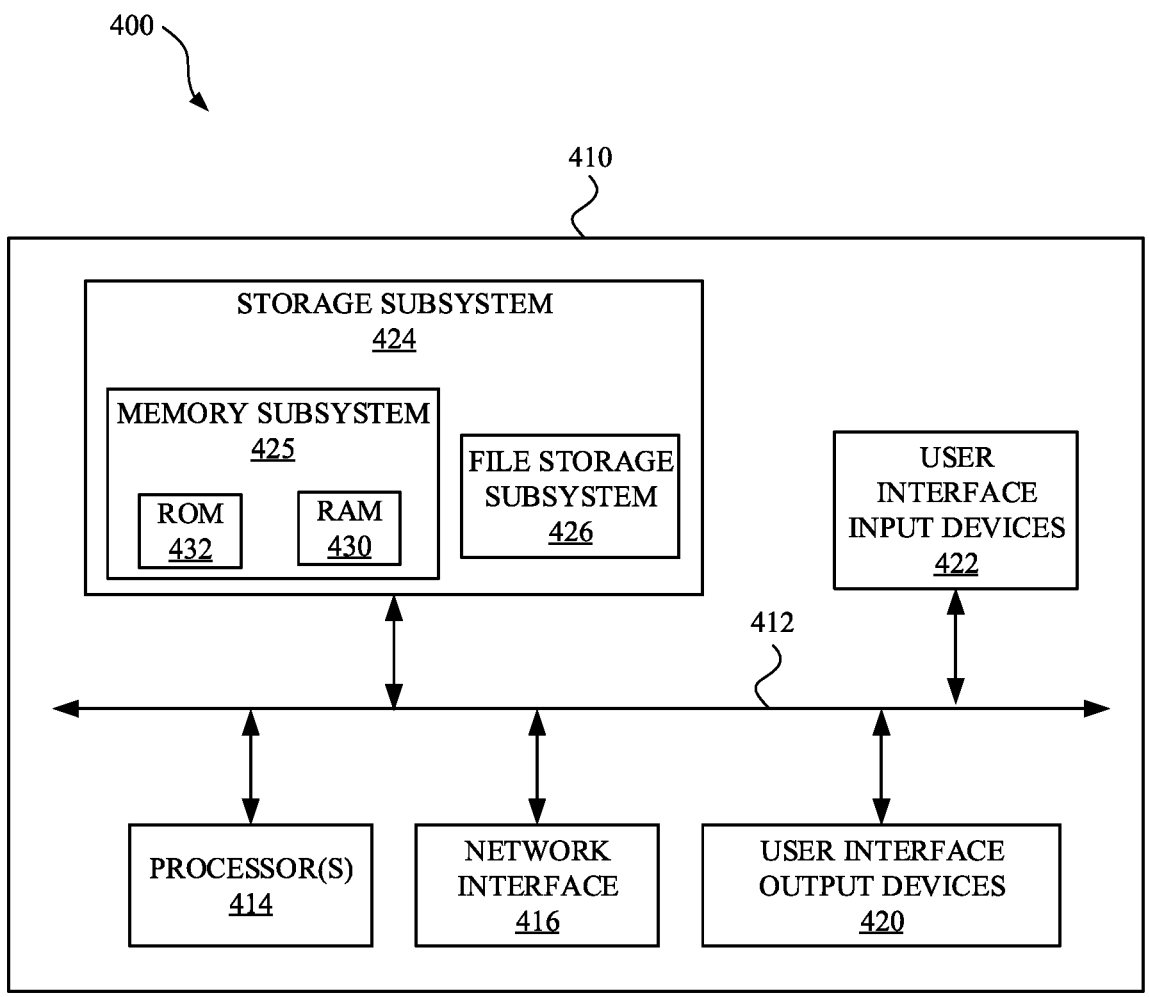
FIG. 4 is a block diagram of an example computer system.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, computing device 104, automated assistant, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as receiving a role change request corresponding to a role change for auxiliary devices that are in communication with a computing device and that include a first auxiliary device and a second auxiliary device, wherein, prior to receiving the role change request: the first auxiliary device sends direct communications to the computing device as a result of being designated as a primary auxiliary device, and the second auxiliary device does not directly send user utterance data to the computing device as a result of being designated as a secondary auxiliary device. The method can further include determining that the role change request has been received simultaneous to an audio input interface of the first auxiliary device receiving a spoken utterance from a user, wherein the spoken utterance is directed to an automated assistant that is accessible via the computing device. The method can further include, in response to determining that the role change request has been received simultaneous to the audio input interface receiving the spoken utterance, determining whether to delay implementation of the role change request until the user is no longer providing any spoken utterance, wherein implementation of the role change request causes the first auxiliary device to not be designated as the primary auxiliary device. The method can further include, when there is a determination to delay the role change request: causing the role change request to be implemented when the user is determined to no longer be providing any spoken utterance to the automated assistant.

In some implementations, the method can further include, when there is an alternative determination to not delay the implementation of the role change request: causing the role change request to be implemented when the user is still providing the spoken utterance to the automated assistant, wherein the implementation of the role change request causes the second auxiliary device to be designated as the primary auxiliary device for receiving additional direct communications from the computing device. In some implementations, determining whether to delay the implementation of the role change request until the user is no longer providing any spoken utterance comprises: determining whether the role change request was provided in furtherance of balancing battery charge consumption at the auxiliary devices, wherein the determination to delay the role change request occurs when the role change request is provided in furtherance of balancing battery consumption at the auxiliary devices. In some implementations, determining whether to delay the implementation of the role change request until the user is no longer providing any spoken utterance comprises: determining whether the role change request was provided in furtherance of causing the first auxiliary device to reboot, wherein the alternative determination to not delay the role change request occurs when the role change request is provided in furtherance of causing the first auxiliary device to reboot.

In some implementations, causing the role change request to be implemented comprises: causing the first auxiliary device to communicate data, characterizing a current audio processing profile, directly to the second auxiliary device. In some implementations, causing the role change request to be implemented comprises: causing the first auxiliary device to communicate audio data directly to the second auxiliary device, wherein the audio data characterizes a portion of the spoken utterance received from the user prior to receiving the role change request. In some implementations, causing the role change request to be implemented comprises: causing a microphone of the second auxiliary device to initialize for capturing, as audio data, a remaining portion of the spoken utterance, and causing another microphone, of the audio input interface of the first auxiliary device, to cease capturing the remaining portion of the spoken utterance, wherein the second auxiliary device provides the audio data to the computing device in furtherance of operating as the primary auxiliary device after the role change request is implemented.

In other implementations, a method implemented by one or more processors is set forth as including operations such as receiving a role change request corresponding to a role change for auxiliary devices that are in communication with a computing device and that include a first auxiliary device and a second auxiliary device, wherein, prior to receiving the role change request: the first auxiliary device receives direct communications from the computing device as a result of being designated as a primary auxiliary device, and the second auxiliary device does not directly communicate with the computing device as a result of being designated as a secondary auxiliary device. The method can further include determining that the role change request has been received simultaneous to an output interface of the first auxiliary device rendering an output, or preparing to render the output, for an automated assistant, wherein the automated assistant that is accessible via the computing device. The method can further include, in response to determining that the role change request has been received simultaneous to the output interface rendering the output, determining whether to delay implementation of the role change request until the output interface is no longer rendering an output or preparing to render the output for the automated assistant, wherein implementation of the role change request causes the first auxiliary device to not be designated as the primary auxiliary device. The method can further include, when there is a determination to delay the implementation of the role change request: causing the role change request to be implemented when the output is no longer being rendered from the output interface for the automated assistant.

In some implementations, the method can further include, when there is a determination to not delay the implementation of the role change request: causing the role change request to be implemented when the output interface is no longer rendering an output, or preparing to render the output, for the automated assistant, wherein the implementation of the role change request causes the second auxiliary device to be designated as the primary auxiliary device for receiving additional direct communications from the computing device. In some implementations, determining whether to delay the implementation of the role change request until the output interface is no longer rendering an output, or preparing to render the output, for the automated assistant comprises: determining whether the role change request was provided in furtherance of preserving battery charge of the first auxiliary device, wherein there is a determination to delay the role change request when the role change request is provided in furtherance of preserving battery charge of the first auxiliary device.

In some implementations, determining whether to delay the implementation of the role change request until the output interface is no longer rendering an output, or preparing to render the output, for the automated assistant comprises: determining whether the role change request was provided in furtherance of resolving a malfunction of the first auxiliary device, wherein there is another determination to not delay the role change request when the role change request is provided in furtherance of resolving the malfunction of the first auxiliary device. In some implementations, causing the role change request to be implemented comprises: causing the computing device to communicate data, characterizing a current processing profile of the first auxiliary device or assistant interaction data, directly to the second auxiliary device. In some implementations, causing the role change request to be implemented includes: causing a microphone of the second auxiliary device to initialize for capturing, as audio data, a subsequent spoken utterance from a user, and wherein the second auxiliary device provides the audio data to the computing device in furtherance of operating as the primary auxiliary device after the role change request is implemented.

In yet other implementations, a method implemented by one or more processors is set forth as including operations such as receiving a role change request corresponding to a role change for auxiliary devices that are in communication with a computing device and that include a first auxiliary device and a second auxiliary device, wherein, prior to receiving the role change request: the first auxiliary device receives direct communications from the computing device as a result of being designated as a primary auxiliary device, and the second auxiliary device does not directly communicate with the computing device as a result of being designated as a secondary auxiliary device. The method can further include determining that the role change request has been received simultaneous to an audio input interface of the first auxiliary device being active, wherein the audio input interface is active for capturing any spoken utterance that is directed to an automated assistant that is accessible via the computing device. The method can further include in response to determining that the role change request was received simultaneous to the audio input interface being active, whether to delay implementation of the role change request until the audio input interface of the first auxiliary device is no longer active, wherein implementation of the role change request causes the first auxiliary device to not be designated as the primary auxiliary device. The method can further include, when there is a determination to delay the implementation of the role change request: causing the role change request to be implemented when the audio input interface is determined to no longer be active for capturing any spoken utterance that is directed to the automated assistant.

In some implementations, the method can further include, when there is an alternative determination to not delay the implementation of the role change request: causing the role change request to be implemented when another audio input interface of the second auxiliary device is active for capturing any spoken utterance that is directed to the automated assistant, wherein the implementation of the role change request causes the second auxiliary device to be designated as the primary auxiliary device for receiving additional direct communications from the computing device. In some implementations, determining whether to delay the implementation of the role change request until the audio input interface of the first auxiliary device is no longer active comprises: determining whether the role change request was provided in furtherance of preserving battery charge of the first auxiliary device, wherein the role change request is delayed when the role change request is provided in furtherance of preserving the battery charge of the first auxiliary device.

In some implementations, determining whether to delay the implementation of the role change request until the audio input interface of the first auxiliary device is no longer active comprises: determining whether the role change request was provided in furtherance of resolving a malfunction of the first auxiliary device, wherein the implementation is delayed when the role change request is provided in furtherance of resolving the malfunction of the first auxiliary device. In some implementations, causing the role change request to be implemented comprises: causing the computing device to communicate data, characterizing an audio processing profile of the first auxiliary device, directly to the second auxiliary device. In some implementations, causing the role change request to be implemented includes: causing another audio interface of the second auxiliary device to initialize for capturing, as audio data, a subsequent spoken utterance from a user, and wherein the second auxiliary device provides the audio data to the computing device in furtherance of operating as the primary auxiliary device after the role change request is implemented. In some implementations, determining whether to delay the implementation of the role change request until the audio input interface of the first auxiliary device is no longer active comprises: determining whether the role change request was provided in furtherance of employing available signal strength of the second auxiliary device, wherein the role change request is delayed when the role change request is provided in furtherance of employing the available strength of the second auxiliary device.

We claim:
1. A method implemented by one or more processors, the method comprising:
receiving a role change request corresponding to a role change for auxiliary devices that are in communication with a computing device and that include a first auxiliary device and a second auxiliary device,
wherein, prior to receiving the role change request:
the first auxiliary device sends direct communications to the computing device as a result of being designated as a primary auxiliary device, and
the second auxiliary device does not directly send user utterance data to the computing device as a result of being designated as a secondary auxiliary device;
determining that the role change request has been received simultaneous to:
an audio input interface of the first auxiliary device receiving a spoken utterance from a user,
wherein the spoken utterance is directed to an automated assistant that is accessible via the computing device;
in response to determining that the role change request has been received simultaneous to the audio input interface receiving the spoken utterance, determining whether to delay implementation of the role change request until the user is no longer providing any spoken utterance,
wherein determining whether to delay the implementation of the role change request comprises determining whether the role change request was provided because of an error interrupting communication between the first auxiliary device and the computing device,
wherein the determination to delay the role change request occurs when the role change request was not provided because of an error interrupting communication between the first auxiliary device and the computing device, and
wherein implementation of the role change request causes the first auxiliary device to not be designated as the primary auxiliary device; and when there is a determination to delay the role change request:
causing the role change request to be implemented when the user is determined to no longer be providing any spoken utterance to the automated assistant.

2. The method of claim 1, further comprising:
when there is an alternative determination to not delay the implementation of the role change request:
causing the role change request to be implemented when the user is still providing the spoken utterance to the automated assistant,
wherein the implementation of the role change request causes the second auxiliary device to be designated as the primary auxiliary device for receiving additional direct communications from the computing device.

3. The method of claim 1, wherein determining whether to delay the implementation of the role change request until the user is no longer providing any spoken utterance comprises:
determining whether the role change request was provided in furtherance of balancing battery charge consumption at the auxiliary devices,
wherein the determination to delay the role change request occurs when the role change request is provided in furtherance of balancing battery consumption at the auxiliary devices.

4. The method of claim 1, wherein determining whether to delay the implementation of the role change request until the user is no longer providing any spoken utterance comprises:
   determining whether the role change request was provided in furtherance of causing the first auxiliary device to reboot,
      wherein the alternative determination to not delay the role change request occurs when the role change request is provided in furtherance of causing the first auxiliary device to reboot.

5. The method of claim 1, wherein causing the role change request to be implemented comprises:
   causing the first auxiliary device to communicate data, characterizing a current audio processing profile, directly to the second auxiliary device.

6. The method of claim 1, wherein causing the role change request to be implemented comprises:
   causing the first auxiliary device to communicate audio data directly to the second auxiliary device,
      wherein the audio data characterizes a portion of the spoken utterance received from the user prior to receiving the role change request.

7. The method of claim 1, wherein causing the role change request to be implemented comprises:
   causing a microphone of the second auxiliary device to initialize for capturing, as audio data, a remaining portion of the spoken utterance, and
   causing another microphone, of the audio input interface of the first auxiliary device, to cease capturing the remaining portion of the spoken utterance,
      wherein the second auxiliary device provides the audio data to the computing device in furtherance of operating as the primary auxiliary device after the role change request is implemented.

8. A method implemented by one or more processors, the method comprising:
   receiving a role change request corresponding to a role change for auxiliary devices that are in communication with a computing device and that include a first auxiliary device and a second auxiliary device,
      wherein, prior to receiving the role change request:
         the first auxiliary device receives direct communications from the computing device as a result of being designated as a primary auxiliary device, and
         the second auxiliary device does not directly send user utterance data to the computing device as a result of being designated as a secondary auxiliary device;
   determining that the role change request has been received simultaneous to:
      an output interface of the first auxiliary device rendering an output, or preparing to render the output, for an automated assistant,
         wherein the automated assistant that is accessible via the computing device;
   in response to determining that the role change request has been received simultaneous to the output interface rendering the output, determining whether to delay implementation of the role change request until the output interface is no longer rendering an output or preparing to render the output for the automated assistant,
      wherein determining whether to delay the implementation of the role change request comprises determining whether the role change request was provided because of an error interrupting communication between the first auxiliary device and the computing device,
      wherein the determination to delay the role change request occurs when the role change request was not provided because of an error interrupting communication between the first auxiliary device and the computing device, and
      wherein implementation of the role change request causes the first auxiliary device to not be designated as the primary auxiliary device; and
   when there is a determination to delay the implementation of the role change request:
      causing the role change request to be implemented when the output is no longer being rendered from the output interface for the automated assistant.

9. The method of claim 8, further comprising:
   when there is a determination to not delay the implementation of the role change request:
      causing the role change request to be implemented when the output interface is no longer rendering an output, or preparing to render the output, for the automated assistant,
         wherein the implementation of the role change request causes the second auxiliary device to be designated as the primary auxiliary device for receiving additional direct communications from the computing device.

10. The method of claim 8, wherein determining whether to delay the implementation of the role change request until the output interface is no longer rendering an output, or preparing to render the output, for the automated assistant comprises:
    determining whether the role change request was provided in furtherance of preserving battery charge of the first auxiliary device,
       wherein there is a determination to delay the role change request when the role change request is provided in furtherance of preserving battery charge of the first auxiliary device.

11. The method of claim 8, wherein determining whether to delay the implementation of the role change request until the output interface is no longer rendering an output, or preparing to render the output, for the automated assistant comprises:
    determining whether the role change request was provided in furtherance of resolving a malfunction of the first auxiliary device,
       wherein there is another determination to not delay the role change request when the role change request is provided in furtherance of resolving the malfunction of the first auxiliary device.

12. The method of claim 8, wherein causing the role change request to be implemented comprises:
    causing the computing device to communicate data, characterizing a current processing profile of the first auxiliary device or assistant interaction data, directly to the second auxiliary device.

13. The method of claim 8, wherein causing the role change request to be implemented includes:
    causing a microphone of the second auxiliary device to initialize for capturing, as audio data, a subsequent spoken utterance from a user, and
       wherein the second auxiliary device provides the audio data to the computing device in furtherance of operating as the primary auxiliary device after the role change request is implemented.

14. A method implemented by one or more processors, the method comprising:
  receiving a role change request corresponding to a role change for auxiliary devices that are in communication with a computing device and that include a first auxiliary device and a second auxiliary device,
    wherein, prior to receiving the role change request:
      the first auxiliary device receives direct communications from the computing device as a result of being designated as a primary auxiliary device, and
      the second auxiliary device does not directly send user utterance data to the computing device as a result of being designated as a secondary auxiliary device;
  determining that the role change request has been received simultaneous to:
    an audio input interface of the first auxiliary device being active,
      wherein the audio input interface is active for capturing any spoken utterance that is directed to an automated assistant that is accessible via the computing device;
  in response to determining that the role change request was received simultaneous to the audio input interface being active, determining whether to delay implementation of the role change request until the audio input interface of the first auxiliary device is no longer active,
    wherein determining whether to delay the implementation of the role change request comprises determining whether the role change request was provided because of an error interrupting communication between the first auxiliary device and the computing device,
    wherein the determination to delay the role change request occurs when the role change request was not provided because of an error interrupting communication between the first auxiliary device and the computing device, and
    wherein implementation of the role change request causes the first auxiliary device to not be designated as the primary auxiliary device; and
  when there is a determination to delay the implementation of the role change request:
    causing the role change request to be implemented when the audio input interface is determined to no longer be active for capturing any spoken utterance that is directed to the automated assistant.

15. The method of claim 14, further comprising:
  when there is an alternative determination to not delay the implementation of the role change request:
    causing the role change request to be implemented when another audio input interface of the second auxiliary device is active for capturing any spoken utterance that is directed to the automated assistant,
    wherein the implementation of the role change request causes the second auxiliary device to be designated as the primary auxiliary device for receiving additional direct communications from the computing device.

16. The method of claim 14, wherein determining whether to delay the implementation of the role change request until the audio input interface of the first auxiliary device is no longer active comprises:
  determining whether the role change request was provided in furtherance of preserving battery charge of the first auxiliary device,
    wherein the role change request is delayed when the role change request is provided in furtherance of preserving the battery charge of the first auxiliary device.

17. The method of claim 14, wherein determining whether to delay the implementation of the role change request until the audio input interface of the first auxiliary device is no longer active comprises:
  determining whether the role change request was provided in furtherance of resolving a malfunction of the first auxiliary device,
    wherein the implementation is delayed when the role change request is provided in furtherance of resolving the malfunction of the first auxiliary device.

18. The method of claim 14, wherein causing the role change request to be implemented comprises:
  causing the computing device to communicate data, characterizing an audio processing profile of the first auxiliary device, directly to the second auxiliary device.

19. The method of claim 14, wherein causing the role change request to be implemented includes:
  causing another audio interface of the second auxiliary device to initialize for capturing, as audio data, a subsequent spoken utterance from a user, and
  wherein the second auxiliary device provides the audio data to the computing device in furtherance of operating as the primary auxiliary device after the role change request is implemented.

20. The method of claim 14, wherein determining whether to delay the implementation of the role change request until the audio input interface of the first auxiliary device is no longer active comprises:
  determining whether the role change request was provided in furtherance of employing available signal strength of the second auxiliary device,
    wherein the role change request is delayed when the role change request is provided in furtherance of employing the available strength of the second auxiliary device.

* * * * *